(12) United States Patent
Nakka et al.

(10) Patent No.: US 11,107,354 B2
(45) Date of Patent: Aug. 31, 2021

(54) SYSTEMS AND METHODS TO RECOGNIZE PARKING

(71) Applicant: Byton North America Corporation, Santa Clara, CA (US)

(72) Inventors: Venkata Siva Prasanth Nakka, San Jose, CA (US); Kun Ma, Mountain View, CA (US)

(73) Assignee: Byton North America Corporation, Santa Clara, CA (US)

( * ) Notice: Subject to any disclaimer, the term of this patent is extended or adjusted under 35 U.S.C. 154(b) by 102 days.

(21) Appl. No.: 16/272,849

(22) Filed: Feb. 11, 2019

(65) Prior Publication Data

US 2020/0258388 A1    Aug. 13, 2020

(51) Int. Cl.
*G06K 9/00* (2006.01)
*G06T 7/70* (2017.01)
*G08G 1/14* (2006.01)

(52) U.S. Cl.
CPC ......... *G08G 1/146* (2013.01); *G06K 9/00812* (2013.01); *G06T 7/70* (2017.01); *G08G 1/143* (2013.01); *G06T 2207/10004* (2013.01); *G06T 2207/20084* (2013.01); *G06T 2207/30264* (2013.01)

(58) Field of Classification Search
CPC .... G08G 1/143; G08G 1/146; G06K 9/00812; G06T 7/70; G06T 2207/10004; G06T 2207/20084; G06T 2207/30264
See application file for complete search history.

(56) References Cited

U.S. PATENT DOCUMENTS

| 10,156,848 | B1* | 12/2018 | Konrardy | B60R 16/0234 |
| 2013/0120161 | A1* | 5/2013 | Wakabayashi | B62D 15/028 340/932.2 |
| 2014/0104422 | A1 | 4/2014 | Choi et al. | |
| 2016/0069703 | A1* | 3/2016 | Nakano | G09B 29/007 701/428 |
| 2016/0267794 | A1* | 9/2016 | Cogill | G08G 1/149 |
| 2018/0130351 | A1 | 5/2018 | Ha et al. | |
| 2018/0321685 | A1* | 11/2018 | Yalla | G05D 1/0274 |
| 2018/0350157 | A1* | 12/2018 | Koreishi | G07B 15/02 |
| 2019/0010855 | A1* | 1/2019 | Green | F16L 23/10 |

(Continued)

FOREIGN PATENT DOCUMENTS

| CN | 107507412 A | 12/2017 |
| CN | 108266033 A | 7/2018 |

(Continued)

OTHER PUBLICATIONS

The International Search Report and Written Opinion of counterpart PCT Application No. PCT/CN2020/074766 dated May 11, 2020, 6 pages.

*Primary Examiner* — Yubin Hung
(74) *Attorney, Agent, or Firm* — Womble Bond Dickinson (US) LLP

(57) ABSTRACT

Systems and methods to recognize a parking space are disclosed. One or more images are captured using one or more cameras coupled to a vehicle at a parking space. Data associated with the parking space are determined from the one or more images. The data associated with the parking space are compared to data stored in a storage device. A parking condition for the vehicle is determined based on the comparing.

28 Claims, 11 Drawing Sheets

(56) References Cited

U.S. PATENT DOCUMENTS

| | | | | |
|---|---|---|---|---|
| 2019/0018861 A1* | 1/2019 | Solem | ................ | G06F 16/5866 |
| 2019/0042897 A1* | 2/2019 | Yang | ................... | G06N 3/0481 |
| 2019/0195641 A1* | 6/2019 | Kim | ..................... | G06F 16/909 |
| 2020/0207333 A1* | 7/2020 | Miller | ............... | B62D 15/0285 |

FOREIGN PATENT DOCUMENTS

| | | | |
|---|---|---|---|
| CN | 108520193 A | * | 9/2018 |
| CN | 108928343 A | | 12/2018 |

\* cited by examiner

| Table 1 | Route ID | Parking space Coordinate 1 (e.g., a latitude) | Parking space Coordinate 2 (e.g., a longitude) | Lists of geographical coordinates for routes |
|---|---|---|---|---|
| | Route 1 | LatP1 (e.g., 41.28) | LongP1 (e.g., 23.87) | List 1 <Lat1/Long1, ..... LatN/LongN> |
| | Route 2 | LatP2 (e.g., 41.29) | LongP2 (e.g., 23.88) | List 2 <Lat1/Long1, ..... LatN/LongN> |
| | Route 3 | LatP3 (e.g., 41.30) | LongP3 (e.g., 23.88) | List 3 <Lat1/Long1, ..... LatN/LongN> |
| | Route 4 | LatP4 (e.g., 41.29) | LongP4 (e.g., 23.87) | List 5 <Lat1/Long1, ..... LatN/LongN> |
| | Route 5 | LatP5 (e.g., 41.28) | LongP5 (e.g., 23.88) | List 6 <Lat1/Long1, ..... LatN/LongN> |

FIG. 10

Table 2

| Color | Rule(s) |
|---|---|
| Red | Rule 1 |
| Yellow | Rule 2 |
| Green | Rule 3 |
| White | Rule 4 |
| Blue | Rule 5 |

Table 3

| Context | Rule(s) |
|---|---|
| Context 1 (e.g., a handicapped parking) | Rule A |
| Context 2 (e.g., a visitor parking) | Rule B |
| Context 3 (e.g., a reserved parking) | Rule C |
| ......... | ......... |
| Context N (e.g., a restricted parking) | Rule D |

FIG. 11

SYSTEMS AND METHODS TO RECOGNIZE PARKING

FIELD

Embodiments of the invention relate to the field of data and image processing and learning. More particularly, embodiments of the invention relate to systems and methods to recognize parking for a vehicle.

BACKGROUND

Parking refers to an act of stopping and disengaging a vehicle and leaving it unoccupied. Countries and local governments have rules for design and use of parking spaces. The parking space can be in a parking garage, in a parking lot, on a city street, or other location. The parking space may be defined by markings. For example, in parking lots for apartments, each apartment has an assigned parking lot number for a resident of that apartment that is shown on a road surface or on a curb. Recognizing a parking space requires human involvement.

SUMMARY

Methods and systems to recognize a parking space for a vehicle are disclosed. For one embodiment, one or more images are captured using one or more image sensors e.g., cameras, LiDAR, radar, and other image sensors coupled to a vehicle at a parking space. Data associated with the parking space are determined from the one or more images. The data associated with the parking space are compared to data stored in a storage device. A parking condition for the vehicle is determined based on the comparing.

For one embodiment, a driving system comprises a one or more image sensors e.g., cameras, LiDAR, radar, and other image sensors to capture one or more images at a parking space. A processor is coupled to the one or more image sensors. The processor is configured to determine data associated with the parking space from the one or more images. The processor is configured to compare the data associated with the parking space to data stored in a storage device. The processor is configured to determine a parking condition for the vehicle based on the comparing.

For one embodiment, a non-transitory machine-readable medium stores executable computer program instructions which when executed by one or more data processing systems cause the one or more data processing systems to perform operations that comprise capturing one or more images using one or more image sensors e.g., cameras, LiDAR, radar, and other image sensors coupled to a vehicle at a parking space; determining data associated with the parking space from the one or more images; comparing the data associated with the parking space to data stored in a storage device; and determining a parking condition for the vehicle based on the comparing.

Other methods, systems, and machine-readable media to recognize parking for an automobile are also described.

BRIEF DESCRIPTION OF THE DRAWINGS

The appended drawings illustrate examples and are, therefore, exemplary embodiments and not considered to be limiting in scope.

FIG. 10 shows an example of a data structure to recognize a parking space for a vehicle according to one embodiment of the invention.

FIG. 11 shows examples of data structures for a special parking according to one embodiment of the invention.

DETAILED DESCRIPTION

Methods and systems to recognize a parking space are disclosed. For one embodiment, one or more images are captured using one or more image sensors e.g., cameras, LiDAR, radar, and other image sensors coupled to a vehicle at a parking space. Data associated with the parking space are determined from the one or more images. The data associated with the parking space are compared to data stored in a storage device. A parking condition for the vehicle is determined based on the comparing. The disclosed techniques to recognize a parking space dynamically, (i.e., on the fly) are performed automatically without human intervention. Dynamic recognition and identification of the parking space by the system advantageously prevents an unauthorized use of the parking space.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
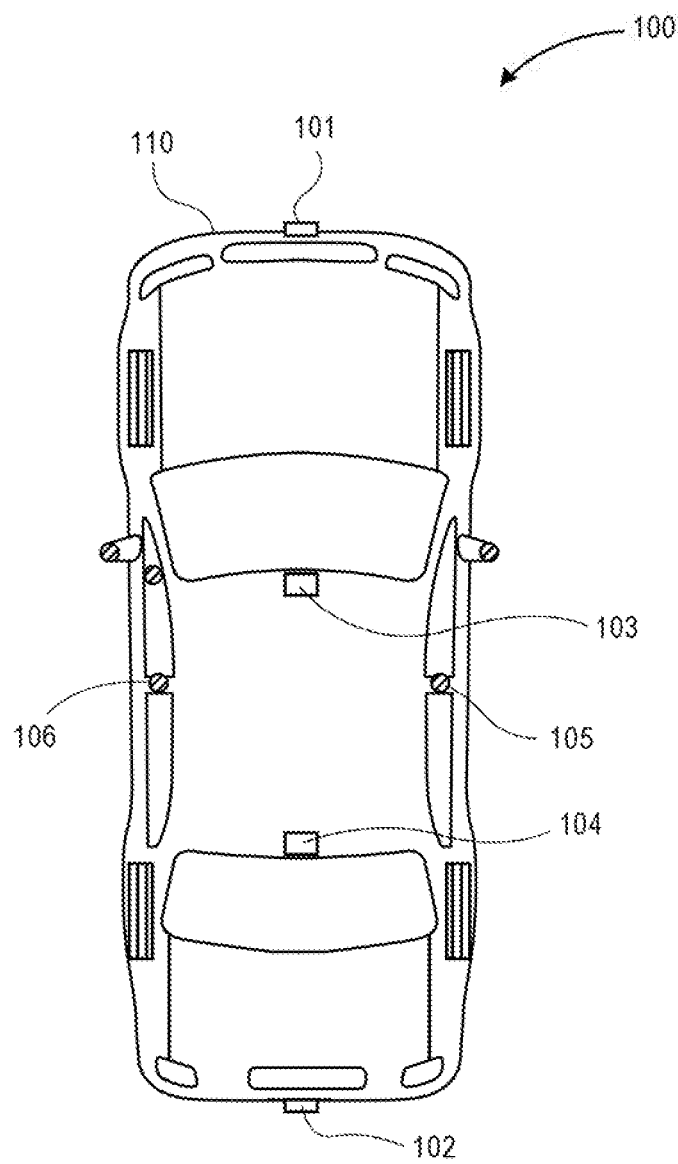
FIG. 1 is a top view of a vehicle that automatically recognizes and identifies a parking space according to an embodiment of the invention.

FIG. 1 is a top view 100 of a vehicle that automatically recognizes and identifies a parking space according to an embodiment of the invention. As shown in FIG. 1, a vehicle 110 includes a set of sensors 101, 102, 103, 104, 105 and 106 mounted on and at different locations of the vehicle that can be used to recognize and identify a parking space, as described in further detail below with respect to FIGS. 2-9.

For one embodiment, the set of sensors includes a set of image sensors such as cameras and a set of other sensors.

For one embodiment, sensor 101 includes a front camera, sensor 102 includes a back camera, sensor 103 includes a top camera, sensors 105 and 106 are side cameras on each side of the vehicle 110. The sensors to recognize and identify a parking space can include any type of commercially available image sensor such as a camera, e.g., a visible spectrum camera, a stereo camera, a red, green, blue (RGB) camera, an infrared camera, or any other camera to capture images of a parking space and one or more other sensors, e.g., laser sensors, radars, GPS or other sensors to determine a geographical location of the vehicle. For one embodiment, recognizing a parking space involves comparing a captured parking space image to a stored parking space image. For one embodiment, identifying a parking space involves establishing an identity of the parking space. For one embodiment, sensor 104 includes one or more global positioning system (GPS) sensors. For one embodiment, vehicle 110 is a car, a sport utility vehicle (SUV), a truck, a bus, or any other machine that transports people, cargo, or a combination thereof. For one embodiment, vehicle 110 is an autonomous driving (AD) vehicle.

Figure 2:
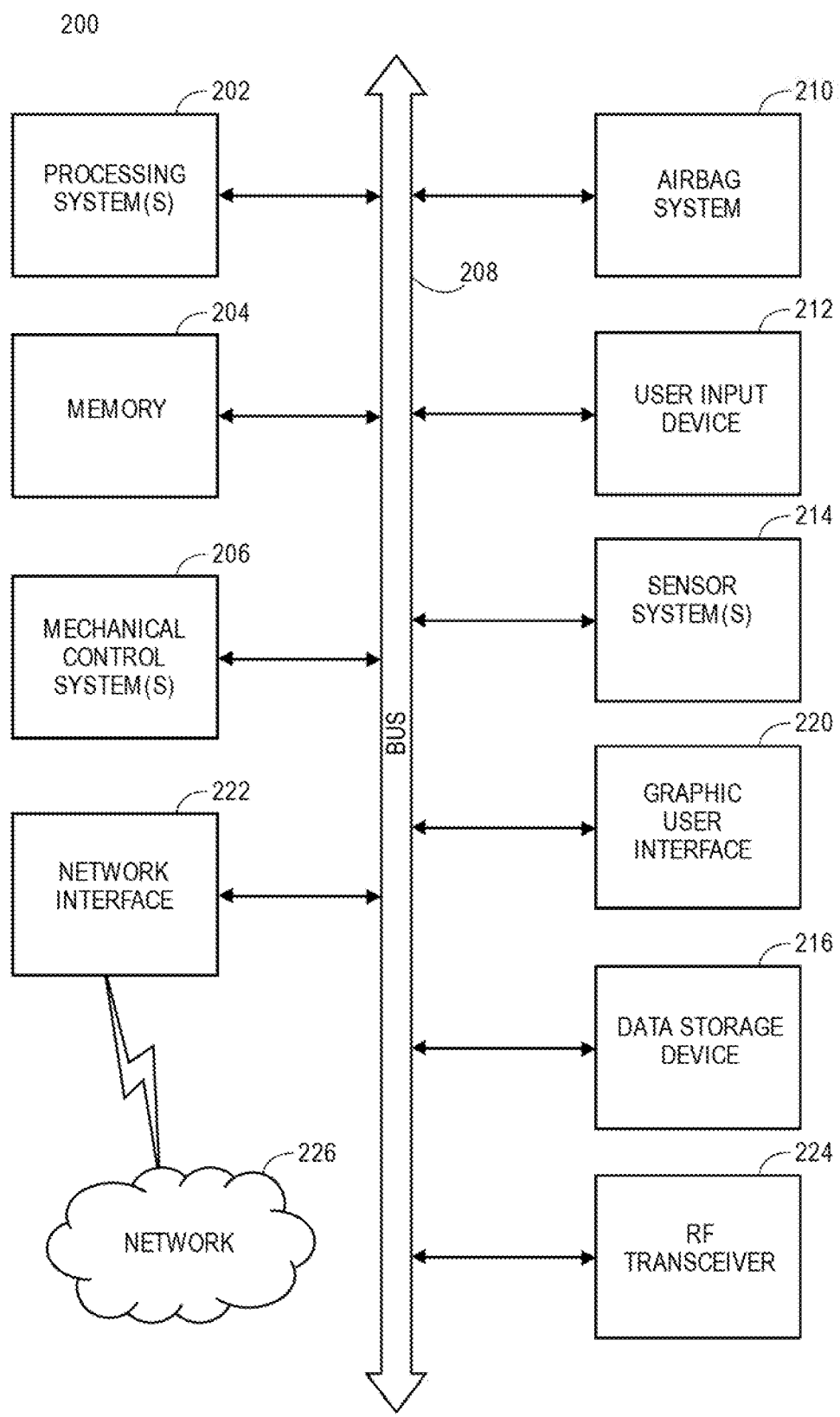
FIG. 2 is a diagram of a data processing system of a vehicle according to an embodiment of the invention.

FIG. 2 is a diagram of a data processing system 200 of vehicle 110 according to an embodiment of the invention. Vehicle 110 is coupled to data processing system 200. For one embodiment, vehicle 110 includes at least a portion of data processing system 200. The data processing system 200 includes a set of instructions to cause the vehicle to perform any one or more of the features and functions to recognize and identify a parking space, as described in further detail with respect to FIGS. 3-9. For an embodiment, the vehicle 110 may communicate via a network 226 to other machines or vehicles. For one embodiment, network 226 is a local area network (LAN), the Internet, or other communication network. For one embodiment, network 226 includes a wireless network. The vehicle can transmit communications (e.g., across the Internet, any wireless communication) to indicate current conditions (e.g., a current condition associated with a parking of the vehicle, as described in further detail below with respect to FIGS. 3-9). The vehicle can operate in the capacity of a server or a client in a client-server network environment, or as a peer machine in a peer-to-peer (or distributed) network environment.

The system 200 includes one or more processing systems 202 (e.g., one or more processors or processing devices (e.g., microprocessor, central processing unit, or the like)), a memory 204 (e.g., read-only memory (ROM), flash memory, dynamic random access memory (DRAM) such as synchronous DRAM (SDRAM or RDRAM), flash memory, static random access memory (SRAM), etc.), and a data storage device 216 (e.g., a secondary memory unit in the form of a drive unit, which may include fixed or removable computer-readable storage medium), which communicate with each other via a bus 208. The one or more processing systems 202 may be configured to perform the operations, as described in further detail with respect to FIGS. 3-9.

The data processing system 200 may further include one or more sensor systems 214, one or more mechanical control systems 206 (e.g., motors, driving wheel control, brake control, throttle control, etc.) and an airbag system 210. For one embodiment, one or more sensor systems 214 includes a set of sensors depicted in FIG. 1. The one or more processing systems 202 execute software instructions to perform different features and functionality (e.g., driving decisions) and provide a graphical user interface 220 for an occupant of the vehicle. The one or more processing systems 202 perform the different features and functionality for an operation of the vehicle based at least partially on receiving an input from the one or more sensor systems 214 that include laser sensors, cameras, radar, GPS, and additional sensors.

The data processing system 200 may further include a network interface device 222. The data processing system 200 also may include an input device 212 (e.g., a touch input, a voice activation device, etc.) and a graphic user interface (GUI) 220 (e.g., a touch-screen with input & output functionality).

The data processing system 200 may further include a RF transceiver 224 that provides frequency shifting, converting received RF signals to baseband and converting baseband transmit signals to RF. In some descriptions a radio transceiver or RF transceiver may be understood to include other signal processing functionality, such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The data storage device 216 may include a machine-readable storage medium (or more specifically a computer-readable storage medium) on which is stored one or more sets of instructions embodying any one or more of the methodologies or functions described herein. A set of instructions to cause the data processing system 200 to perform one or more operations to recognize and identify a parking space can be stored within the memory 204, within the one or more processing systems 202, within the data storage device 216, or any combination thereof that also constitute machine-readable storage media.

The term "machine-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 3:
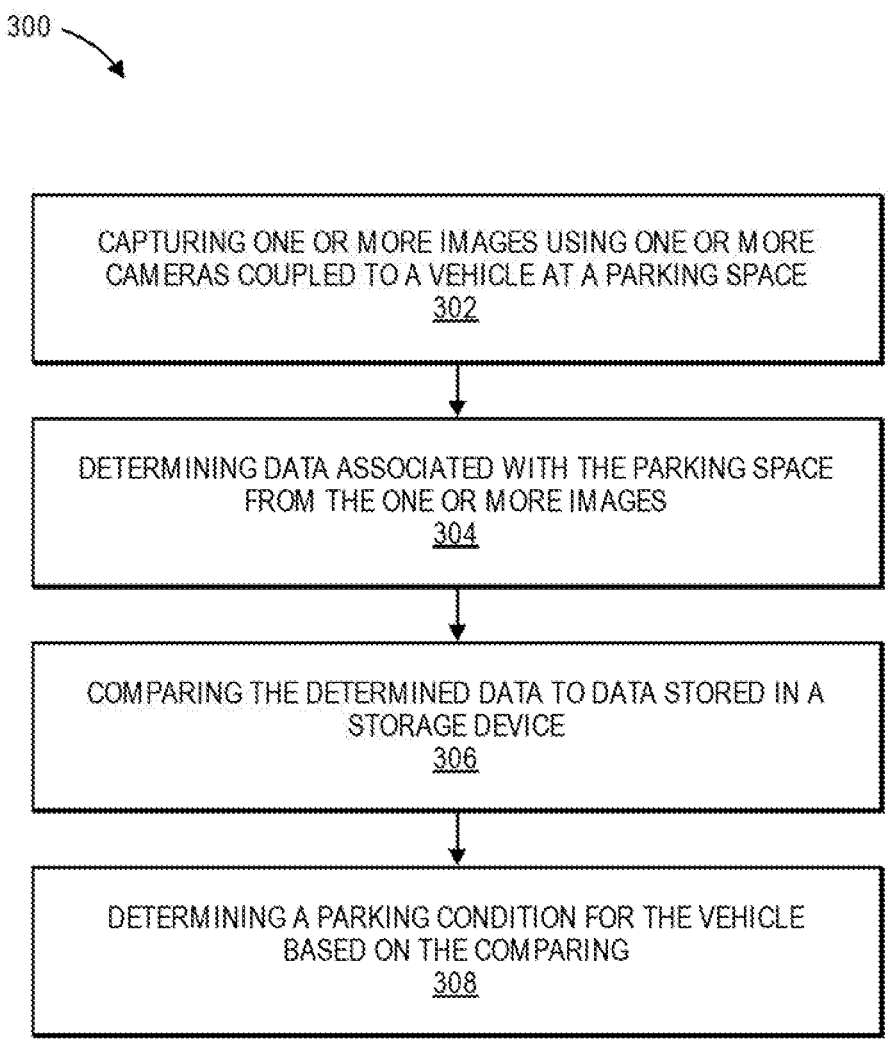
FIG. 3 is a flowchart of a method to recognize a parking space for a vehicle according to one embodiment of the invention.

FIG. 3 is a flowchart of a method 300 to recognize a parking space for a vehicle 110 according to one embodiment of the invention. At operation 302 one or more images associated with a parking space are captured using one or more cameras to determine data that identify the parking space.

At operation 304, the data that identify the parking space comprising a number, a color, other context, or any combination thereof, are extracted from the one or more images associated with the parking space. For example, an apartment complex has a plurality of reserved or assigned parking lots (spaces). Each parking space is identified by a unique parking space number that is assigned or reserved to a resident or a visitor of the apartment complex. The number can be anywhere on the ground, on a sign, or other place that is within or adjacent to the corresponding parking space. A resident of the apartment complex has an assigned parking space that is identified by a unique parking space number, e.g., 211, 212, or any other number N. For one embodiment, as a vehicle 110 approaches to an assigned parking space, the camera mounted on vehicle 110 starts to capture images of the parking spaces to determine assigned parking space numbers.

For another example, some parking spaces include a special or reserved parking space. Some special parking spaces have a curb coloring that indicates a condition (rule) with respect to parking. For example, a red curb color indicates no parking at any time (Rule 1), a yellow curb color indicates a commercial loading zone (Rule 2), a green curb color is time limited e.g., for 30 minutes (Rule 3), a white curb color indicates a passenger loading zone with a time limit of about 10 minutes (Rule 4), a blue curb color is accompanied by the blue and white disabled person sign and is for the use of disabled persons with the properly displayed permits only (Rule 5). Some special or reserved parking space has an indicator or sign that indicates a condition (rule) with respect to parking for the parking space, e.g., handicapped parking (Rule A), reserved parking for visitors (Rule B), veteran parking (Rule C); restricted parking (e.g., no parking between time t1 and t2, from Monday to Friday (Rule D); parking by permit only, compact car parking; customer parking, no parking any time, no overnight parking, or any other special or reserved parking condition. The user trying to park the vehicle may not see that the parking space is a special parking space. For one embodiment, as vehicle 110 approaches to a parking space, the camera mounted on vehicle 110 starts to capture images of the parking space to determine data associated with the parking space. In these examples, such data comprise curb coloring, or special indicator or sign associated with the parking space.

Still at operation 304 data associated with the parking space, including one or more parking space numbers, context, color, or any combination thereof are determined or extracted from the captured images using at least one of neural networks techniques and image processing techniques. For one embodiment, the neural networks techniques include a convolutional neural network (CNN, or ConvNet) or other neural networks technique. For one embodiment, the image processing techniques include an optical character recognition (OCR) technique, or other image processing technique. For one embodiment, one or more images associated with the parking area are captured using one or more image sensors coupled to the vehicle at a parking area. The captured one or more image data are output from the one or more image sensors to at least one of a CNN unit or a ConvNet unit. The at least one of the CNN unit or the ConvNet unit is configured to verify that the vehicle is within the parking area based on the captured one or more image data and data stored in a memory. After verifying, the at least one of the CNN unit or the ConvNet unit is configured to output the verified image data to an OCR unit. The OCR unit is configured to extract one or more parking conditions data from the verified image data and compares the extracted data with data stored in a memory. For one embodiment, each of the at least one of the CNN unit or the ConvNet unit and the OCR unit comprises a memory and one or more processors coupled to the memory.

At operation 306 the data associated with the parking space are compared to data stored in a storage device, e.g., one or more of the storage devices described above with respect to FIG. 2. For example, a user of the vehicle has an assigned parking space that is identified by a number 212, or any other number. The assigned parking space number has been previously stored in the storage device for the vehicle. For one embodiment, the vehicle extracts a parking space number from the captured images. The vehicle compares the extracted number with the previously stored assigned parking space number.

For another example, special parking conditions or rules corresponding to various data associated with the parking space have been previously stored in the storage device for the vehicle. For one embodiment, the vehicle extracts data associated with the parking space from the captured images. The vehicle compares the extracted data associated with the parking space with the previously stored special parking conditions or rules corresponding to various data associated with the parking space.

At operation 308 a parking condition for the vehicle is determined based on comparing the determined data with the previously stored data. For example, the extracted number is compared with the previously stored assigned parking space number, and if the extracted number does not match with the previously stored assigned parking space number, it is determined that the vehicle is parked at a wrong location that is different from the assigned parking space location, and a notification indicating the wrong parking space is sent to the user. If the extracted number matches with the previously stored assigned parking space number, it is determined that the vehicle is parked at a correct location that corresponds to the assigned parking space.

For another example, a vehicle tries to park at a special parking space. The extracted data associated with the parking space is compared with the previously stored special parking conditions or rules corresponding to various data associated with a parking space. If the extracted data matches with a previously stored special condition or rule corresponding to the extracted data, a parking condition or rule that corresponds to the parking space is determined, as described in further detail below with respect to FIG. 9.

Figure 4:
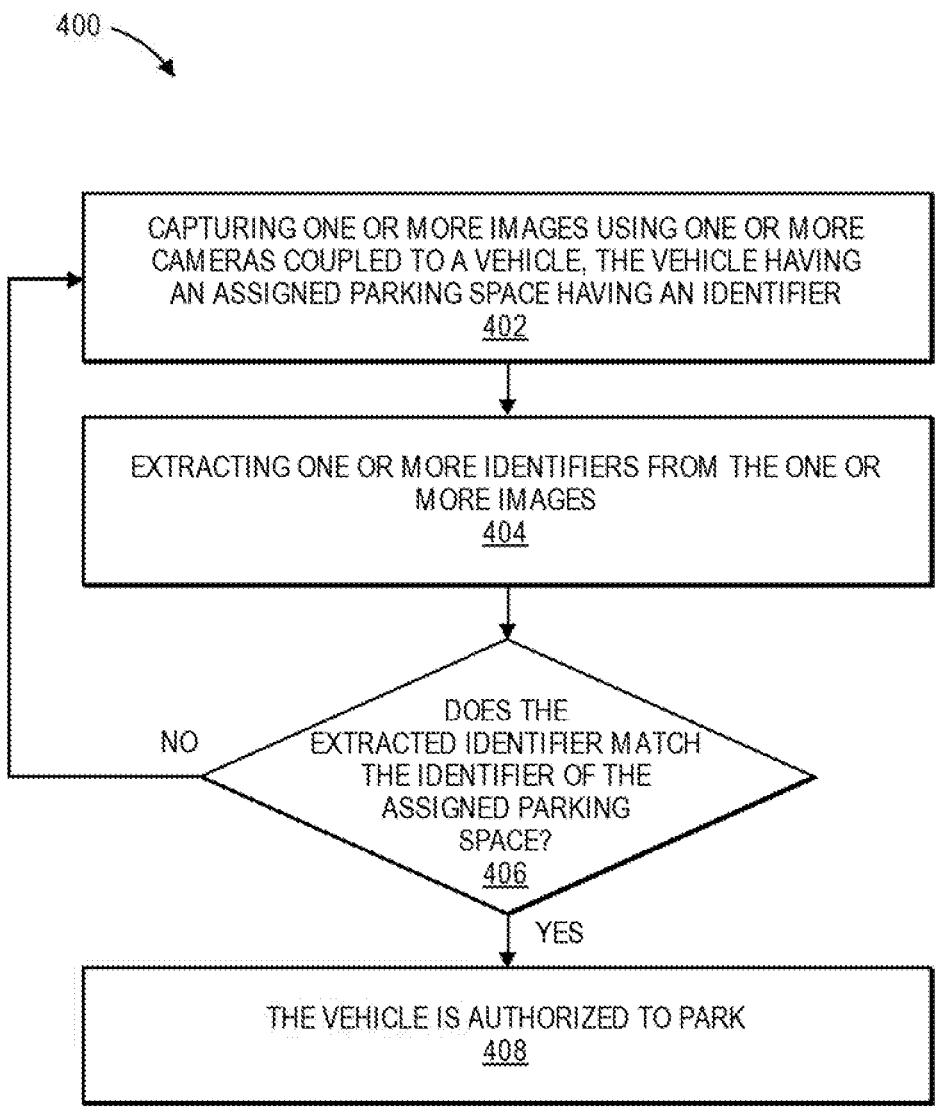
FIG. 4 is a flowchart of a method to recognize an assigned parking space for a vehicle according to one embodiment of the invention.

FIG. 4 is a flowchart of a method 400 to recognize an assigned parking space for a vehicle 110 according to one embodiment of the invention. At operation 402 one or more images associated with one or more parking spaces are captured using one or more cameras coupled to a vehicle that has an assigned parking space that has an identifier. For one embodiment, the assigned parking space identifier has been stored in a storage device, as described above. At operation 404 one or more identifiers are extracted from the one or more images using at least one of image processing techniques and neural network techniques, as described above.

At operation 406 it is determined whether the extracted identifier matches with the identifier of the assigned parking space stored in the storage device, as described above. If the extracted identifier matches with the identifier of the assigned parking space, at operation 408 it is determined that the vehicle is authorized to park at the parking space. If the extracted identifier does not match with the identifier of the assigned parking space, method 400 goes to operation 402.

Figure 5:
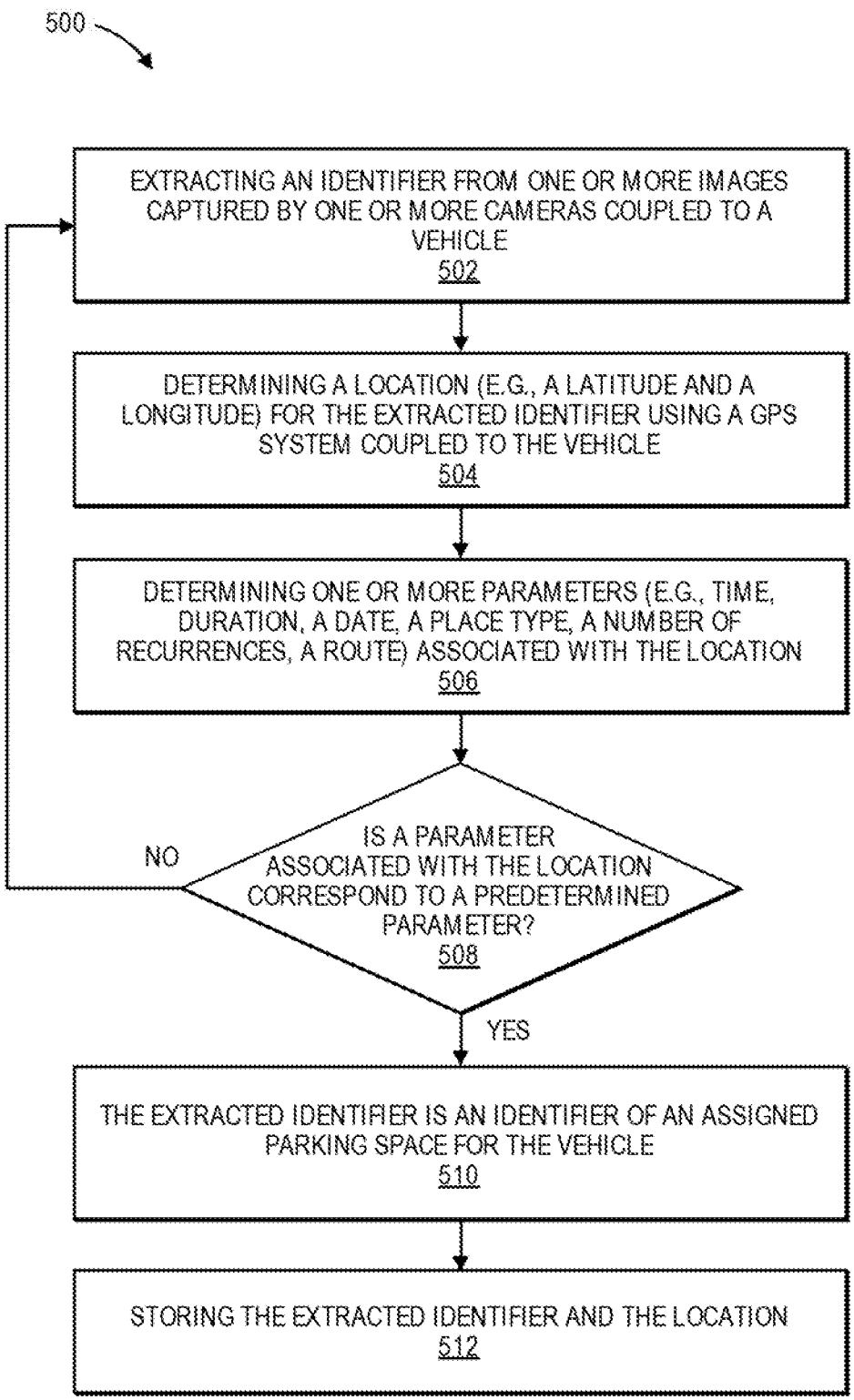
FIG. 5 is a flowchart of a method to learn about an assigned parking space according to one embodiment of the invention.

FIG. 5 is a flowchart of a method 500 to learn about an assigned parking space for a vehicle 110 according to one embodiment of the invention. At operation 502 an identifier of the parking space is extracted from one or more images captured by one or more cameras coupled to a vehicle, as described above. At operation 504 a geographical location of the parking space identified by the extracted identifier is determined using one or more GPS or other location sensors coupled to the vehicle. For one embodiment, the geographical location of the parking space includes a latitude (Lat) and a longitude (Long), or other geographical coordinates of the parking space. In other words, the parking space identifier is mapped to the geographical coordinates that define location of the parking space.

At operation 506 one or more parameters associated with the geographical location of the parking space are determined for the vehicle. For one embodiment, the one or more parameters include an arrival time of the vehicle to the parking space location; a departure time of the vehicle from the parking space location, a time during which the vehicle remains at the parking space location, a date at which the vehicle stays at the parking space location, a place type (e.g., an apartment complex, a shopping mall, an office parking, a gasoline station, or any other place type), a number of parking recurrences that indicates how many times the vehicle is parked at the same parking space location, or any combination thereof. For one embodiment, a place type can be determined using a software application, e.g. Google Places, or any other software application to determine a place type.

For one embodiment, the vehicle 110 automatically learns about an assigned parking space location based on the one or more parameters. For one embodiment, it is determined that the parking space is an assigned parking space if a confidence level is greater than a predetermined threshold. The confidence level that the parking space is an assigned parking space is determined based on the one or more parameters. For example, if a number of times the vehicle parks at the same parking space is greater than a predetermined number, the confidence level that the parking space is the assigned parking increases. For example, if a type of the parking space is an apartment complex parking, the confidence level that the parking space is the assigned parking increases. On the other hand, if a type of the parking space is a hotel or airport parking, the confidence level that the parking space is the assigned parking decreases. For example, if the vehicle parks at the parking space during night, the confidence level that the parking space is the assigned parking increases. For example, if the vehicle parks at the same location for a predetermined number of days (e.g., at least three days), and for a predetermined duration (e.g., at least 7 hours), the confidence level that the parking space is the assigned parking space increases.

At operation 508 it is determined whether the parameter that is associated with the location of the parking space for the vehicle matches with a predetermined parameter stored in a storage device. If the parameter associated with the location of the parking space for the vehicle matches with the predetermined parameter, at operation 510 it is determined that the extracted identifier is an assigned parking space identifier for the vehicle. At operation 512 the extracted identifier and corresponding location of the parking space are stored in a storage device. If the parameter associated with the location of the parking space for the vehicle does not match with the predetermined parameter, method 500 returns to operation 502.

For one embodiment, the vehicle 110 automatically learns about an assigned parking space number using one or more neural network techniques. For one embodiment, the vehicle is configured to automatically learn about a location of the assigned parking space (e.g., using one or more machine learning unsupervised algorithms, e.g., a K-Means algorithm, a DBscan algorithm, or any combination thereof algorithms).

For one embodiment, the vehicle extracts an identification number of the parking space from one or more images captured by one or more cameras and stores the extracted numbers in a storage device. For one embodiment, when a vehicle enters a parking area, one or more images associated with the parking area are captured using one or more image sensors attached to the vehicle. For one embodiment, the one or more image sensors are configured to output the captured one or more image data to at least one of a CNN unit or a ConvNet unit. For one embodiment, the at least one of the CNN unit or the ConvNet unit is configured to verify that the vehicle is within the parking area based on at least one of the one or more image data and data stored in a memory. After the CNN unit verifies that the vehicle is within the parking area, the CNN unit outputs the verified image data to an OCR unit.

The OCR unit is configured to extract one or more parking space identification numbers from the verified image data. The OCR unit is configured to compare the extracted one or more parking space identification numbers with the parking space identification numbers stored in a memory. If the identification number of the parking space matches to the stored parking space identification number, it is determined that the identification number is the identification number of the parking space assigned to the vehicle. For one embodiment, each of the CNN unit and the OCR unit comprises a memory and one or more processors coupled to the memory. For one embodiment, the OCR unit includes an open source OSR software provided by Google or other OSR software stored in the memory.

For example, each time the vehicle parks, the vehicle extracts the numbers from the captured images of the parking spaces and compares the numbers with the stored numbers. For example, if it is determined that the vehicle is parked at a parking space identified by a number 212 for a predetermined time duration at the same user apartment location, the system learns that the parking space identified by number 212 is the assigned parking space for the vehicle. The vehicle also determines a latitude value and a longitude value that correspond to the location of the parking space using a GPS or other location sensors, and stores the latitude and longitude values in the storage device. For one embodiment, a minimum time for the system to learn the location of the assigned parking space is greater than two days and less than one week. For one embodiment, learning and remembering the assigned parking space number is performed dynamically (i.e., on the fly) by a vehicle control unit (VCU) without human intervention. For one embodiment, one or more processing systems 202 represent the VCU.

Figure 6:
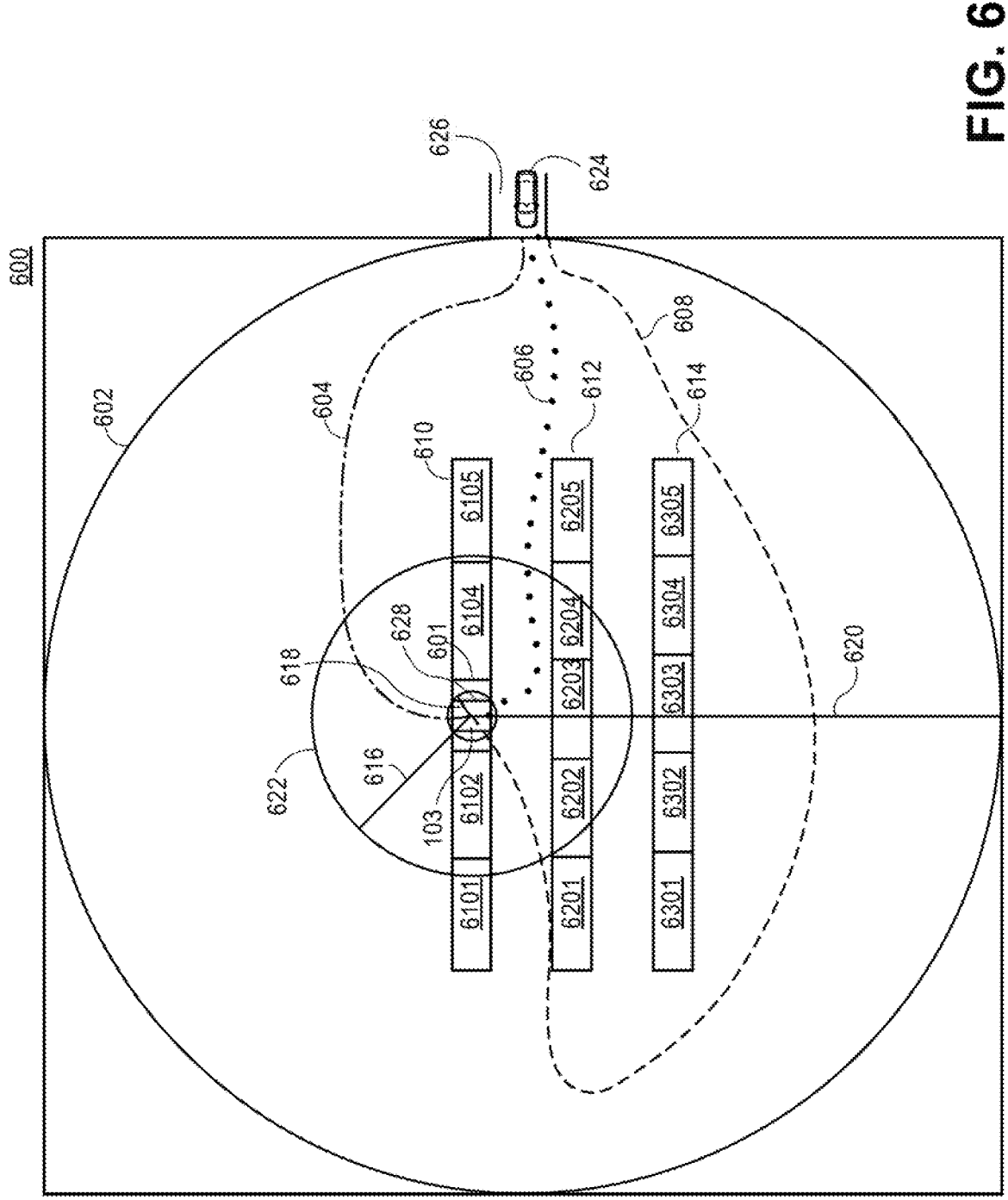
FIG. 6 is a diagram of a residential area including parking spaces for vehicles according to one embodiment of the invention.

FIG. 6 is a diagram of a residential area 600 including parking spaces for vehicles according to one embodiment of the invention. The residential area 600 has rows 610, 612 and 614 of assigned parking spaces for vehicles and an entrance 626. As shown in FIG. 6, a row 610 has a plurality of parking spaces identified by numbers 6101, 6102, 6103, 6104 and 6105. A row 612 has a plurality of parking spaces identified by numbers 6201, 6202, 6203, 6204 and 6205. A row 614 has a plurality of parking spaces identified by numbers 6301, 6302, 6303, 6304 and 6305. For example, a parking space 601 identified by number 103 is assigned to a vehicle 624. The vehicle can reach the assigned parking space 601 by taking different routes, such as a route 604, a route 606, or a route 608. For one embodiment, the VCU of the vehicle determines a distance between a current location of the vehicle and the assigned parking space, and guides the vehicle to the assigned parking space based on the determined distance, as described below.

Figure 7:
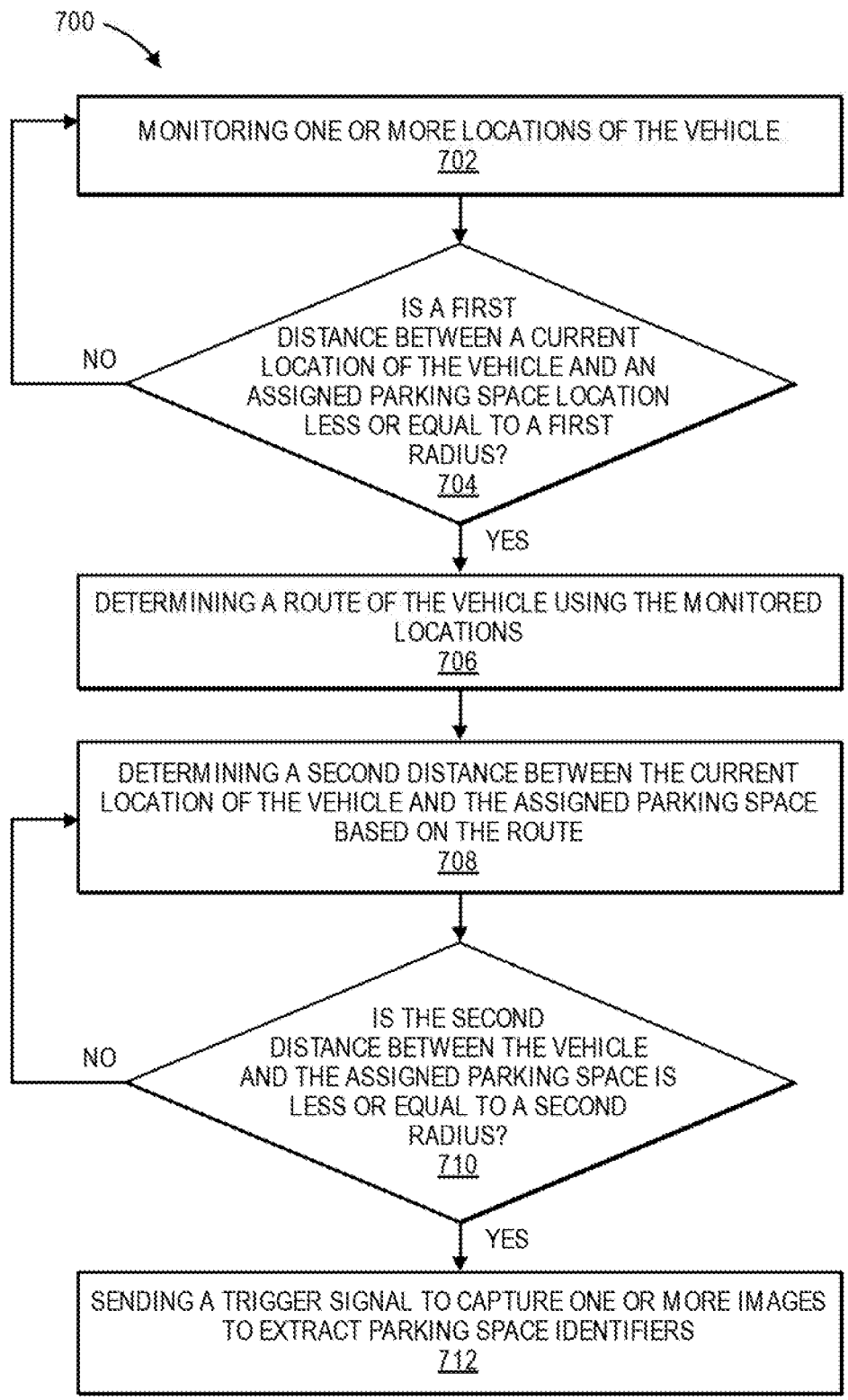
FIG. 7 is a flowchart of a method to recognize an assigned parking space for a vehicle according to one embodiment of the invention.

FIG. 7 is a flowchart of a method 700 to recognize an assigned parking space for a vehicle according to one embodiment of the invention. At operation 702 one or more locations of the vehicle are monitored. For one embodiment as described in FIG. 6, as the vehicle moves towards the assigned parking space 601, a current location of the vehicle is monitored. For one embodiment, the current location of the vehicle is mapped to the location of the assigned parking space. For an embodiment, a current geographical location (Lat/Long) of the vehicle is monitored using one or more GPS or other location sensors. For one embodiment, the current geographical location (Lat/Long) of the vehicle is monitored periodically in time, or in space.

At operation 704 it is determined whether a distance between the current location of the vehicle and an assigned parking space location is less or equal to a first radius. For one embodiment, the first radius is a radius 620 of a largest circle 602 within residential area 600 that has the assigned parking space 601 as a center, as shown in FIG. 6. If the distance between the current location of the vehicle and the assigned parking space location is not less or equal to the first radius, method 700 returns to operation 702. If the distance between the current location of the vehicle and the assigned parking space location is less or equal to the first radius, at operation 706 a route of the vehicle is determined using the monitored locations. For example, as the vehicle passes through the entrance 626 to residential area 600, the system starts to store the values of the monitored geographical coordinates of the vehicle to estimate a route of the vehicle.

FIG. 10 shows an example of a data structure to recognize a parking space for a vehicle according to one embodiment of the invention. As shown in FIG. 10, a Table 1 represent the data structure. For one embodiment, the data structure is created and stored in a storage device coupled to the vehicle. For one embodiment, the storage device is a memory of the vehicle, a database, a cloud, or a combination thereof. As shown in FIG. 10, Table 1 includes routes for the vehicle that are determined based on monitored current location of the vehicle. Table 1 has a plurality of columns. Column 1001 shows a plurality of patterns to extract routes for the vehicle, e.g., a Route 1, a Route 2, a Route 3, a Route 4 and a Route 5. Column 1002 shows a geographical coordinate 1 (e.g., a Lat) for an assigned parking space for each route. Column 1003 shows a geographical coordinate 2 (e.g., a Long) for the assigned parking space for each route. Column 1004 shows lists including geographical coordinates for each route, such as List 1<Lat1/Long1, . . . LatN/LongN>, List 2<Lat1/Long1, . . . LatN/LongN>, List 3<Lat1/Long1, . . . LatN/LongN>, List 4<Lat1/Long1, LatN/LongN>, List 5 1<Lat1/Long1, . . . LatN/LongN>. For one embodiment, a list for a route includes at least 20 entries of the Lat/Long coordinates.

Returning to FIG. 7, at operation 708 a distance between the current location of the vehicle and the assigned parking space is estimated based on the route. For example, if the vehicle after entering gate 626 follows a route 604, the distance between the current location of the vehicle and the assigned parking space is estimated based on route 604. At operation 710 it is determined if a distance between the current location of the vehicle and the assigned parking space is less or equal to a second radius. For one embodiment, the second radius is a radius 616 of a middle circle 622 that has the assigned parking space 601 as a center, as shown in FIG. 6. For one embodiment, the second radius is smaller than the first radius. If the distance between the current location of the vehicle and the assigned parking space location is not less or equal to the second radius, method 700 returns to operation 708. If the distance between the current location of the vehicle and the assigned parking space location is less or equal to the second radius, at operation 712 a trigger signal is sent to capture one or more images of the parking spaces by one or more cameras coupled to the vehicle to extract parking space identifiers, as described above with respect to FIGS. 3 and 4.

For one embodiment, as the vehicle 110 automatically learns about the assigned parking location, the second radius is reduced. For one embodiment, the second radius is in an approximate range from about 10 meters to about 200 meters. For one embodiment, the size of the second radius decreases as the confidence level that the parking space is the assigned parking space increases. For an embodiment, the system recognizes a route of the vehicle by comparing the current geographical location of vehicle with the locations of the routes stored in a memory. As soon as the system recognizes a route of the vehicle, the system does not need to take images from a faraway (e.g., from a distance greater than 10 meters) from the assigned parking space that advantageously saves the system power and processing resources.

For one embodiment, it is optionally determined if a distance between the current location of the vehicle and a center the assigned parking space is less or equal to a third radius. For one embodiment, the third radius is a radius 618 of a small circle 628 that has a center of the assigned parking space 601, as shown in FIG. 6. For one embodiment, the third radius is smaller than the second radius. For one embodiment, the third radius is about a half of the size of the vehicle. For one embodiment, the third radius is in an approximate range from about 0.5 meters to about 2 meters. If the distance between the current location of the vehicle and the center of the assigned parking space is not less or equal to the third radius, the method continues with capturing one or more images of the parking spaces by one or more cameras coupled to the vehicle to extract parking space identifiers, as described above with respect to FIGS. 3 and 4. If the distance between the current location of the vehicle and the center of the assigned parking space is less or equal to the third radius, it is determined that the vehicle is at the assigned parking space location and the method stops.

Figure 8:
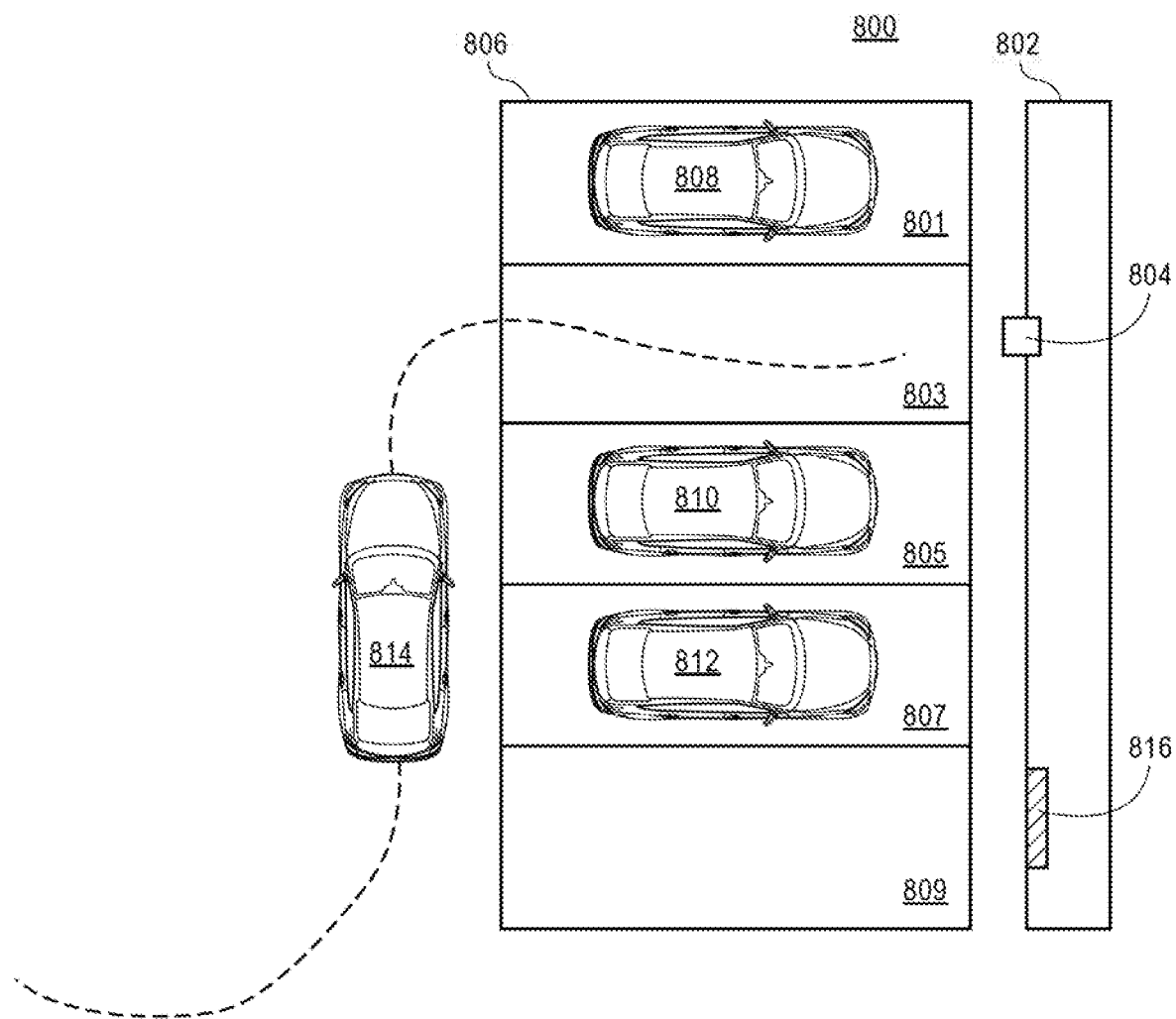
FIG. 8 is a diagram of a parking area according to one embodiment of the invention.

FIG. 8 is a diagram of a parking area 800 according to one embodiment of the invention. Parking area 800 includes a plurality of parking spaces 801, 803, 805, 807, and 809. A parking space 803 is a special parking space that is identified by a sign 804 at a curb 802. Sign 804 provides a context that corresponds to a condition or rule for the parking space 803. A parking space 809 is a special parking space that is identified by a colored portion 816 of curb 802. Colored portion 816 indicates a condition or rule for the parking space 809. Vehicles 808, 810, and 812 are parked in parking spaces 801, 805, and 807 respectively. Vehicle 814 tries to park in a special parking space, as shown in FIG. 8. For one embodiment, if the vehicle 814 tries to park in the special parking space, and such parking is not authorized for a user of the vehicle, an alert is sent to the user, as described in further detail below. For one embodiment, if the vehicle 814 tries to park in the special parking space, and such parking is not authorized for a user of the vehicle, an alert is sent to an advanced driver-assistance system (ADAS) or an autonomous driving (AD) system of the vehicle to facilitate automated or autonomous driving e.g., an automatic valet parking.

Figure 9:
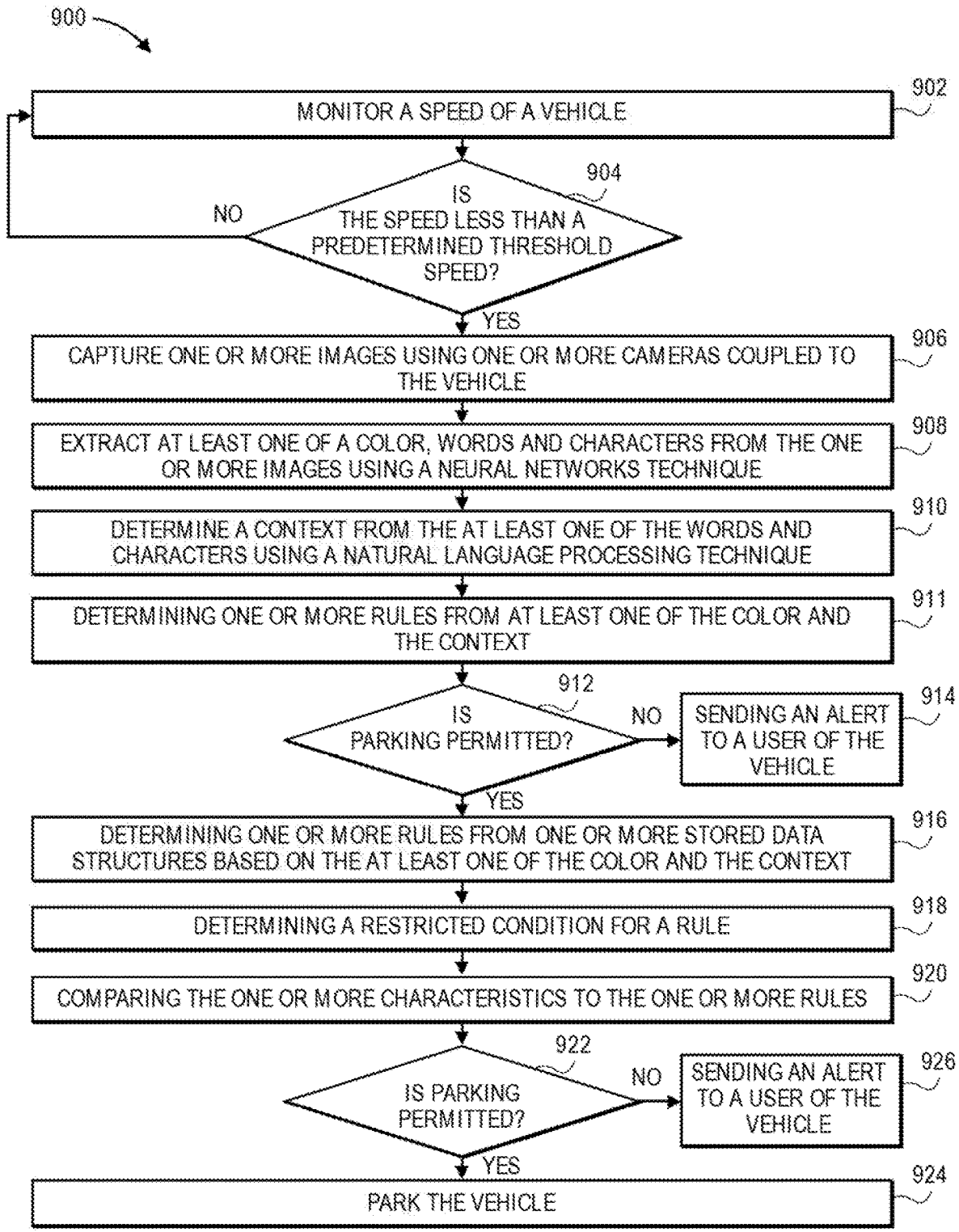
FIG. 9 is a flowchart of a method to recognize a special parking space according to one embodiment of the invention.

FIG. 9 is a flowchart of a method 900 to recognize a special parking space according to one embodiment of the invention. At operation 902 a speed of a vehicle is monitored to determine if the vehicle is parking. At operation 904 it is determined if the speed is less than a predetermined threshold. If the speed is not less than the predetermined threshold, method 900 returns to operation 902. If the speed is less than the predetermined threshold, at operation 906 one or more images of the parking space are captured using one or more cameras coupled to the vehicle, as described above with respect to FIG. 3. For one embodiment, the captured images include images of neighboring parked vehicles, e.g., vehicles 810, 811, and 812. At operation 908 data including at least one of a color, words, and characters is extracted from the one or more images using one or more neural network techniques and image processing techniques. For one embodiment, the neural networks techniques include a convolutional neural network (CNN, or ConvNet) or other neural networks technique.

The neural networks techniques are known to one of ordinary skill in the art. For one embodiment, the image processing techniques include an optical character recognition (OCR) technique, or other image processing technique. For one embodiment, the one or more image sensors are configured to output the captured one or more image data to at least one of a CNN unit or a ConvNet unit. For one embodiment, the at least one of the CNN unit or the ConvNet unit is configured to verify that the vehicle is within a parking area based on at least one of the one or more image data and data stored in a memory. After the at least one of the CNN unit or the ConvNet unit verifies that the vehicle is within the parking area, the at least one of the CNN unit or the ConvNet unit outputs the verified image data to an OCR unit. The OCR unit is configured to extract data including at least one of a color, words, and characters from the verified image data. For one embodiment the extracted data include at least one of a color, words, and characters. For one embodiment, the extracted data are compared with the data stored in a memory to recognize a special parking space, as described in further detail below. For one embodiment, each of the CNN unit and the OCR unit comprises a memory and one or more processors coupled to the memory. For one embodiment, the OCR unit includes an open source OSR software provided by Google or other OSR software stored in the memory.

At operation 910 a data associated with the parking space such as a context is determined based on the at least one of the words and characters using a natural language processing technique. The natural language processing techniques are known to one of ordinary skill in the art. For one embodiment, the context includes a number, a color, one or more characters, one or more words, other context, or any combination thereof.

At operation 911 one or more rules are determined from the determined data such as the color or other context using data structures previously stored in a storage device. For one embodiment, the extracted color is mapped to a rule for the vehicle using the stored data structure. For one embodiment, the determined or extracted data such as a context is mapped to a condition or rule of parking for the vehicle using the data structure, as described in further detail below.

FIG. 11 shows examples of the stored data structures for a special parking according to one embodiment of the invention. As shown in FIG. 11, Table 2 and Table 3 represent the data structures. For one embodiment, each of Table 2 and Table 3 has been previously created and stored in a storage device coupled to the vehicle. For one embodiment, the storage device is a memory of the vehicle, a database, a cloud, or a combination thereof. As shown in FIG. 11, Table 2 includes colors that are mapped to corresponding rules for the vehicle corresponding to the colors. Column 1101 shows a plurality of color identifiers, e.g., Red, Yellow, Green, White, and Blue. Column 1102 shows corresponding rules for color, e.g., Rule 1, Rule 2, Rule 3, Rule 4, Rule 5 that correspond to Red, Yellow, Green, White, Blue respectively, as described above. As shown in FIG. 11, Table 3 includes contexts and rules for the vehicle corresponding to the contexts. Column 1201 shows a plurality of contexts, e.g., context 1 (e.g., a handicapped parking), context 2 (e.g., a visitor parking), context 1 (e.g., a reserved parking), context N (e.g., a restricted parking). A column 1202 shows corresponding rules (e.g., Rule A, Rule B, Rule C, and Rule D for the respective Contexts 1, 2, 3, 4, and 5.

Referring to FIGS. 9 and 11, the extracted color is compared with the colors stored in Table 2. If the extracted color matches with one of the stored colors, the matched color is mapped to one of the rules stored in the Table 2. The rule is determined from the Table 2 for the matched color. For one embodiment, a rule is determined from the extracted context. For one embodiment, the extracted context is compared with the contexts stored in Table 3. If the extracted context matches with one of the stored contexts, the matched context is mapped to one of the rules stored in Table 3. The rule is determined from the Table 3 for the matched data such as a context associated with the parking space.

At operation 912 it is determined if a parking for the vehicle is authorized (permitted) according to the mapped rule. If the rule indicates that the parking is not permitted any time, at operation 914 an alert is sent to a user of the vehicle that the user cannot park the vehicle. For one embodiment, an alert is sent wirelessly by the vehicle control unit to the user's phone. For one embodiment, an alert is sent to an advanced driver-assistance system (ADAS) or an autonomous driving (AD) system of the vehicle to facilitate automated or autonomous driving e.g., an automatic valet parking.

For example, the alert may contain an indication for the user of the vehicle to move away from the parking space location. If the rule determined based on the at least one of the color and the context indicates that the parking is permitted with a restricted condition, at operation 916 the restricted condition is determined for the rule based on the at least one of the extracted color and the context. At operation 918 one or more characteristics associated with at least one of the user and the vehicle are determined based on the restricted condition. For one embodiment, the one or more characteristics include a date, a time of the day, a day of the week at which the vehicle is parked, a parking time duration, an authorization for the user of the vehicle to park, or any combination thereof. At operation 920 the one or more characteristics associated with at least one of the user and the vehicle are compared with the one or more rules.

At operation 922 it is determined if the restricted parking for the user of the vehicle is authorized (permitted) based on the comparing the one or more characteristics and the one or more rules. If the restricted parking is not permitted for the user of the vehicle, at operation 926 an alert is sent to a user of the vehicle. For one embodiment, an alert is sent wirelessly by the vehicle control unit to the user's phone. For one embodiment, an alert is sent to an advanced driver-assistance system (ADAS) or an autonomous driving (AD) system of the vehicle to facilitate automated or autonomous driving e.g., an automatic valet parking.

For example, the alert may contain an indication for the user of the vehicle to move away from the parking space location. If the restricted parking is permitted, at operation 924 the vehicle is parked. For one embodiment, if the restricted condition indicates that the parking is restricted for an authorized person only, and the characteristics of the user of the vehicle indicate that the user is not the authorized person for parking at this location, an alert is issued to the user of the vehicle.

For one embodiment, if the restricted condition indicates that the parking is restricted to a predetermined time, a current time is compared with a predetermined threshold and current coordinates of the vehicle are compared with the coordinates of the parking space. If the current time is greater than the predetermined threshold, and the current coordinates of the vehicle match to the coordinates of the parking space, an alert is issued to the user of the vehicle. For example, when the vehicle is parked, there may be a board (sign) including a warning about the duration allowed for parking. If a user of the vehicle does not notice the board and the vehicle is parked for the duration that is longer than the duration indicated on the sign, the user can get a ticket. For one embodiment, a camera on a vehicle reads the warning on the board. The vehicle automatically determines if the warning has been violated. The vehicle sends an alert to a phone of the user, if the warning has been violated.

For one embodiment, if the restricted condition indicates that the parking is restricted to one or more predetermined weekdays (e.g., Sunday and Saturday), a current weekday is compared with the one or more predetermined days and current coordinates of the vehicle are compared with the coordinates of the parking space. If the current weekday does not match the one or more predetermined weekdays, and the current coordinates of the vehicle match to the coordinates of the parking space, an alert is issued to the user of the vehicle. In various embodiments, hardwired circuitry may be used in combination with software instructions to implement the embodiments described herein. Thus the techniques and methods are not limited to any specific combination of hardware circuitry and software, or to any particular source for the instructions executed by the one or more data processing systems.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A data processing system to recognize a parking space for a vehicle comprising:
one or more image sensors to capture one or more images at a first parking space;
a processor coupled to the one or more image sensors, wherein the processor is configured to determine first data associated with the first parking space from the one or more images, wherein the processor is configured to compare the first data to second data stored in a storage device, and wherein the processor is configured to determine a parking condition for the vehicle based on the comparing, wherein the processor is further configured to monitor one or more locations of the vehicle, wherein the processor is further configured to determine a route of the vehicle based on the monitoring, wherein the processor is further configured to determine a first radius based on the route, wherein the processor is further configured to send a trigger signal to capture the one or more images, if a distance between the vehicle and the first parking space is less or equal to the first radius.

2. The data processing system of claim 1, wherein the processor is further configured to determine a first location of the vehicle, wherein the processor is further configured to determine one or more first parameters associated with the first location of the vehicle, wherein the processor is further configured to determine the first parking space as an assigned parking space for the vehicle based on the one or more first parameters; and wherein the processor is further configured to store a data to indicate the first parking space as an assigned parking space in a storage device.

3. The method of claim 2, wherein the one or more first parameters include a time; a duration; a date; a place type, a number of parking recurrences; or any combination thereof.

4. The data processing system of claim 1, wherein the processor is further configured to send a notification to a user of the vehicle based on the parking condition.

5. The data processing system of claim 1, wherein the processor is further configured to send a notification to at least one of an advanced driver-assistance system or an autonomous driving system of the vehicle.

6. The data processing system of claim 1, wherein the first data are determined using a neural network technique.

7. The data processing system of claim 1, wherein the first data include a first identifier associated with the first parking space and wherein the second data include a second identifier associated with an assigned parking space.

8. The data processing system of claim 1, wherein the first data include a context associated with the first parking space; and the second data include one or more rules associated with the first parking space.

9. The data processing system of claim 1, wherein the first parking space is one or more of a handicapped parking; a visitor parking, a reserved parking, a red curb parking, a yellow curb parking, a white curb parking, or a green curb parking.

10. The data processing system of claim 1, wherein the parking condition includes an authorization for the vehicle to park at the first parking space.

11. A non-transitory machine-readable medium storing executable computer program instructions which when executed by one or more data processing systems cause the one or more data processing systems to perform operations comprising:
capturing one or more images using one or more cameras coupled to a vehicle at a first parking space;
determining first data associated with the first parking space from the one or more images;
comparing the first data to second data stored in a storage device;
determining a parking condition for the vehicle based on the comparing;
monitoring one or more locations of the vehicle;
determining a route of the vehicle based on the monitoring;
determining a first radius based on the route; and
sending a trigger signal to capture the one or more images, if a distance between the vehicle and the first parking space is less or equal to the first radius.

12. The non-transitory machine-readable medium of claim 11, further comprising instructions that cause the one or more data processing systems to perform operations comprising:
determining a first location of the vehicle;
determining one or more first parameters associated with the first location of the vehicle;

determining the first parking space as an assigned parking space for the vehicle based on the one or more first parameters; and storing the first parking space in a storage device.

13. The non-transitory machine-readable medium of claim 11, further comprising instructions that cause the one or more data processing systems to perform operations comprising:

sending a notification to a user of the vehicle based on the parking condition.

14. The non-transitory machine-readable medium of claim 11, further comprising instructions that cause the one or more data processing systems to perform operations comprising:

sending a notification to at least one of an advanced driver-assistance system or an autonomous driving (AD) system of the vehicle.

15. The non-transitory machine-readable medium of claim 11, wherein the first data are determined using a neural network technique.

16. The non-transitory machine-readable medium of claim 11, wherein the first data include a first identifier associated with the first parking space and wherein the second data include a second identifier associated with an assigned parking space.

17. The non-transitory machine-readable medium of claim 11, wherein the first data include a context associated with the first parking space; and the second data include one or more rules associated with the first parking space.

18. The non-transitory machine-readable medium of claim 11, wherein the first parking space is one or more of a handicapped parking; a visitor parking, a reserved parking, a red curb parking, a yellow curb parking, a white curb parking, or a green curb parking.

19. The non-transitory machine-readable medium of claim 11, wherein the parking condition includes an authorization for the vehicle to park at the first parking space.

20. A machine implemented method to recognize a parking space comprising:

capturing one or more images using one or more cameras coupled to a vehicle at a first parking space;

determining first data associated with the first parking space from the one or more images;

comparing the first data to second data stored in a storage device;

determining a parking condition for the vehicle based on the comparing;

monitoring one or more locations of the vehicle;

determining a route of the vehicle based on the monitoring;

determining a first radius based on the route; and sending a trigger signal to capture the one or more images, if a distance between the vehicle and the first parking space is less or equal to the first radius.

21. The method of claim 20, further comprising:

determining a first location of the vehicle;

determining one or more first parameters associated with the first location of the vehicle;

determining the first parking space as an assigned parking space for the vehicle based on the one or more first parameters; and storing the first parking space in a storage device.

22. The method of claim 20, further comprising:

sending a notification to a user of the vehicle based on the parking condition.

23. The method of claim 20, further comprising:

sending a notification to a notification to at least one of an advanced driver-assistance system or an autonomous driving system of the vehicle.

24. The method of claim 20, wherein the first data are determined using a neural network technique.

25. The method of claim 20, wherein the first data include a first identifier associated with the first parking space and wherein the second data include a second identifier associated with an assigned parking space.

26. The method of claim 20, wherein the first data include a context associated with the first parking space; and the second data include one or more rules associated with the first parking space.

27. The method of claim 20, wherein the first parking space is one or more of a handicapped parking; a visitor parking, a reserved parking, a red curb parking, a yellow curb parking, a white curb parking, or a green curb parking.

28. The method of claim 20, wherein the parking condition includes an authorization for the vehicle to park at the first parking space.

* * * * *